US011553820B1

(12) United States Patent
Alexander

(10) Patent No.: US 11,553,820 B1
(45) Date of Patent: Jan. 17, 2023

(54) PIPING BAG STAND

(71) Applicant: Stevie Cheyenne Alexander, Asheville, NC (US)

(72) Inventor: Stevie Cheyenne Alexander, Asheville, NC (US)

( * ) Notice: Subject to any disclaimer, the term of this patent is extended or adjusted under 35 U.S.C. 154(b) by 0 days.

(21) Appl. No.: 16/873,752

(22) Filed: Jun. 25, 2020

(51) Int. Cl.
*A47J 47/16* (2006.01)
*B65B 67/12* (2006.01)

(52) U.S. Cl.
CPC ............ *A47J 47/16* (2013.01); *B65B 67/1227* (2013.01); *B65B 67/1233* (2013.01)

(58) Field of Classification Search
CPC ........ A47J 47/16; B65B 67/122; B65B 67/04; B65B 67/1205; B65B 67/1233; B65B 67/1255; B65B 67/12; B65F 1/1415; B65F 1/141; B65F 2240/138
USPC ....... 248/95, 97, 99, 100, 101, 205.8, 206.2, 248/206.3, 205.5
See application file for complete search history.

(56) References Cited

U.S. PATENT DOCUMENTS

| 494,141 | A | * | 3/1893 | Harris | A47F 5/108 |
| | | | | | 211/199 |
| 1,414,575 | A | * | 5/1922 | McCart | B65B 67/12 |
| | | | | | 248/97 |
| 1,858,649 | A | * | 5/1932 | Weakley | B65B 67/12 |
| | | | | | 248/97 |
| 2,673,053 | A | * | 3/1954 | Kilian | B65F 1/141 |
| | | | | | 248/153 |
| 3,276,733 | A | * | 10/1966 | Rosser | B65F 1/141 |
| | | | | | 248/146 |
| 3,627,242 | A | * | 12/1971 | Vandermast | B65B 67/1205 |
| | | | | | 248/97 |
| 3,771,752 | A | * | 11/1973 | Meeh | B65B 67/12 |
| | | | | | 248/98 |
| 4,562,983 | A | * | 1/1986 | Kiefbeck | B65B 67/12 |
| | | | | | 248/97 |
| 4,899,967 | A | * | 2/1990 | Johnson | B65B 67/12 |
| | | | | | 248/97 |
| 4,901,959 | A | * | 2/1990 | Stage | B65B 67/1205 |
| | | | | | 220/4.24 |
| 5,183,226 | A | * | 2/1993 | Brooks | B65B 67/1205 |
| | | | | | 248/97 |
| 5,558,246 | A | * | 9/1996 | Ross, Jr. | A47F 7/28 |
| | | | | | 220/4.22 |
| 5,738,314 | A | * | 4/1998 | Davis | B65B 67/1205 |
| | | | | | 248/175 |
| 5,784,972 | A | * | 7/1998 | Emalfarb | A47G 7/041 |
| | | | | | 108/156 |

(Continued)

*Primary Examiner* — Nkeisha Smith
(74) *Attorney, Agent, or Firm* — Southern Plains IP Law PLLC; Sue C. Watson

(57) ABSTRACT

The stand is constructed to free up a person's hands to fill a piping bag for decorating food. It is secured to a working space with the four rubber suction cups attached to the bottom of each leg of the stand. A food grade piping bag is placed down inside the top circle and folded over the circle and secured in place with the four alligator clips located at the top of the stand. This secures the bag and holds it open to be filled with any variety of food for decorating. When the decorating has been completed, the bag can be unclipped and removed from the stainless-steel stand, which can be easily cleaned by removing the drip plate resting on the bottom circle of the stand and the entire stand can be washed by hand or placed inside a dishwasher.

1 Claim, 1 Drawing Sheet

(56) References Cited

U.S. PATENT DOCUMENTS

| | | | | |
|---|---|---|---|---|
| 5,797,567 | A * | 8/1998 | Magnafici | B65B 67/1227 248/101 |
| 5,924,657 | A * | 7/1999 | Bach | B65B 67/1227 248/97 |
| 6,199,802 | B1 * | 3/2001 | Scheibe, Sr. | B65F 1/1415 248/101 |
| 6,467,735 | B1 * | 10/2002 | Clinton | B65B 67/12 248/153 |
| 6,520,457 | B1 * | 2/2003 | Yardley | B65B 67/1233 248/97 |
| 6,651,942 | B1 * | 11/2003 | Yardley | B65B 67/1233 248/100 |
| 6,895,712 | B2 * | 5/2005 | Gunderman | A01G 9/12 211/85.23 |
| 7,284,732 | B1 * | 10/2007 | Lopa | B65B 67/1233 248/101 |
| 7,874,100 | B2 * | 1/2011 | Miller | A01G 9/12 47/46 |
| 8,857,772 | B1 * | 10/2014 | Weldon | B65B 67/1238 248/97 |
| 9,033,291 | B2 * | 5/2015 | Branham | B65B 67/1205 248/99 |
| 9,302,848 | B1 * | 4/2016 | Wadleigh | B65B 67/1238 |
| 9,440,789 | B2 * | 9/2016 | Moayed Sabeti | B65B 67/04 |
| 9,708,754 | B2 * | 7/2017 | Philip | D06F 95/002 |
| 10,351,338 | B1 * | 7/2019 | Tyle | B65F 1/141 |
| 10,617,239 | B2 * | 4/2020 | Cowley | A47G 7/025 |
| 2005/0039612 | A1 * | 2/2005 | Denny | A47J 37/0623 99/450 |
| 2008/0302924 | A1 * | 12/2008 | Albert | B65B 67/12 248/99 |
| 2012/0001035 | A1 * | 1/2012 | Michel | B65B 67/1238 248/97 |
| 2012/0104188 | A1 * | 5/2012 | Andersen | B65B 67/1227 248/97 |
| 2012/0325984 | A1 * | 12/2012 | Moynihan | B65B 67/1233 248/98 |
| 2014/0311356 | A1 * | 10/2014 | Daniels | A47J 37/0713 99/340 |
| 2014/0312185 | A1 * | 10/2014 | Moayed Sabeti | B65B 67/1205 248/97 |
| 2015/0144749 | A1 * | 5/2015 | Leyshon | A01G 9/02 248/97 |
| 2015/0144750 | A1 * | 5/2015 | Moses | B65B 67/1238 248/97 |
| 2020/0102109 | A1 * | 4/2020 | Mondrone | B65B 67/1205 |

* cited by examiner

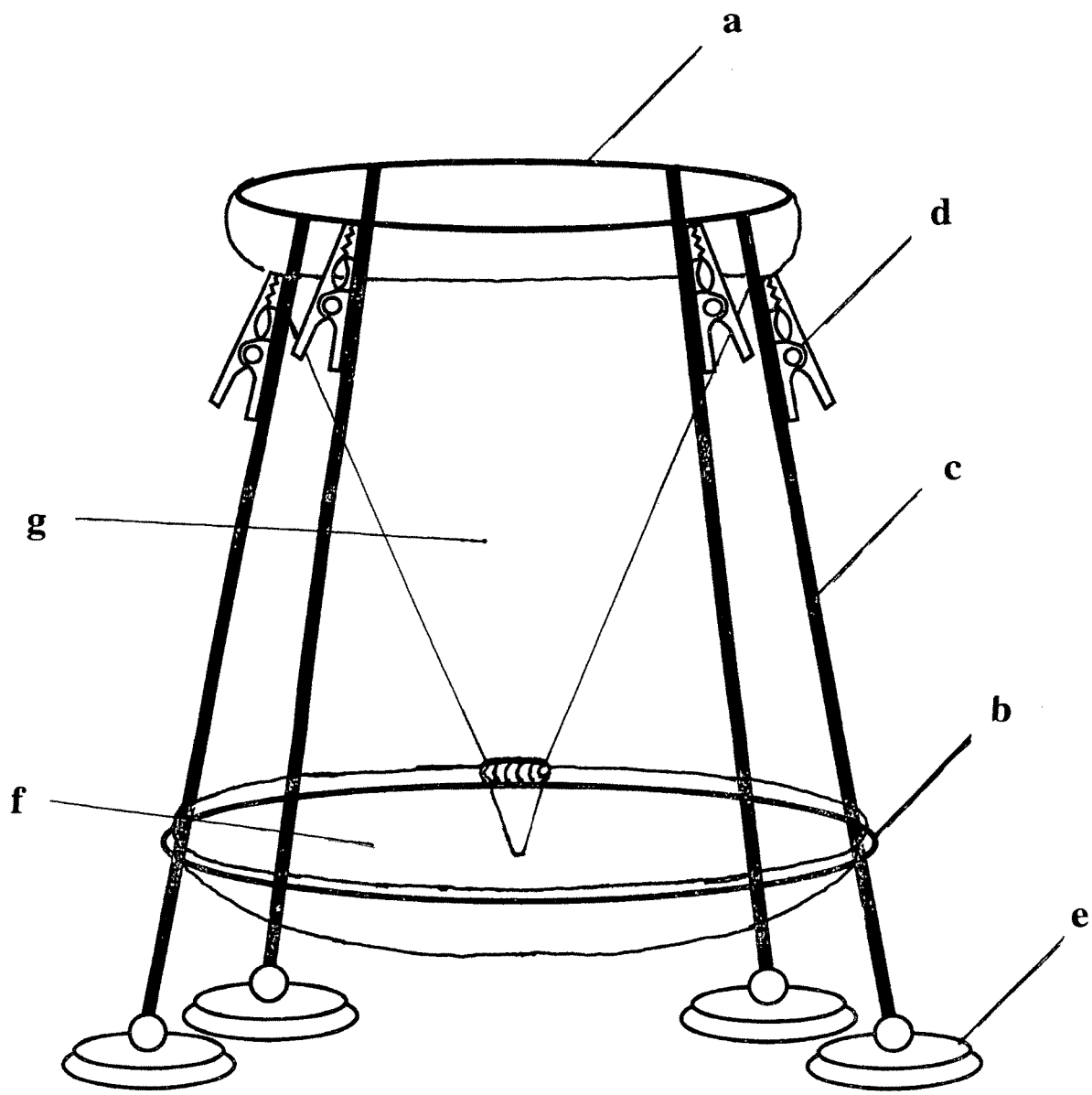

PIPING BAG STAND

CROSS-REFERENCE TO RELATED APPLICATION yes

STATEMENT REGARDING FEDERALLY SPONSORED RESEARCH OR DEVELOPMENT none

THE NAMES OF THE PARTIES TO A JOINT RESEARCH AGREEMENT none

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

none

STATEMENT REGARDING PRIOR DISCLOSURES BY THE INVENTOR OR A JOINT INVENTOR none

BACKGROUND OF THE INVENTION

(1) Field of the Invention

Cookware

(2) Description of Related Art Including Information Disclosed Under 37 CFR 1.97 and 1.98 none

BRIEF SUMMARY OF THE INVENTION

This design addresses the problem that most decorators experience while working with food. The stand provides a way to free up both hands of the person who will be decorating food for an event.

BRIEF DESCRIPTION OF THE SEVERAL OF THE DRAWING(S)

FIG. 1
a. Eight-inch top circle securing top of stand
b. Nine-inch bottom circle securing bottom legs
c. Four sixteen-inch legs
d. Four alligator clips to secure piping bag
e. Four rubber suction cups to secure stand to working surface
f. Removable drip plate rests on the bottom circle of stand
g. Piping bag to be filled with food for decorating

DETAILED DESCRIPTION OF THE INVENTION

Both professional and amateur chefs and bakers have experienced the same problem at one time or another when decorating food for a special event or a party. Often, when it is time to refill the decorating bag with a particular food product, while also attempting to hold the bowl while scooping or spooning the food as well as holding the piping bag open, requires an extra pair of hands. The piping bag stand shown in (FIG. 1a-f) solves the problem, as it frees up both hands of the person decorating a specific food item. When the piping bag shown in (FIG. 1g) is placed down into the stand through the top circle shown in (FIG. 1a) and then secured with each of the four alligator clips shown in (FIG. 1d) that are attached to each of the four legs of the stand shown in (FIG. 1c) it holds the piping bag open, which enables the person decorating to more easily fill the piping bag to the desired fullness. The four rubber suction cups shown in (FIG. 1e) secures the piping bag stand to the working surface or counter, which keeps the stand secure on the working surface from tipping over when the decorating bag is being filled with the food that is to be used for decorating. The removable drip plate shown in (FIG. 1f) rests on the bottom circle shown in (FIG. 1b), which also acts in securing the four legs of the stand and making it more durable and stronger in order to hold the piping bag securely while filling it without tipping over and is designed to catch any drips from the food inside the piping bag. This keeps the work space clean and saves on cleanup time. The stand is constructed of dishwasher safe stainless steel. This design finally resolves the problem for individuals who spend a great deal of time decorating food for special events, as it eliminates the struggle in holding open a piping bag.

The invention claimed is:

1. A piping bag stand with a piping bag adapted to be filled with food, the piping bag stand consisting of:
    an upper horizontal support having a circular body in a shape of a ring, the upper support having an outer surface and a diameter of 8 inches and located at a top of the stand,
    a lower horizontal support having a circular body in a shape of a ring, the lower support having a diameter greater than the diameter of the upper support, the diameter of the lower support being 9 inches,
    four legs for supporting the stand in a supporting surface,
        wherein, each of the legs has an upper end, a lower end, a medial portion and a length of 16 inches, the upper end of each leg is attached to a bottom of the outer surface of the circular body of the upper support and the medial portion of each leg is attached to the outer surface of the circular body of the lower support,
        wherein, the legs are spaced around the outer surface of the circular body of the upper support and extend downward and toward an outer surface of the circular body of the lower support, the legs are spaced around the outer surface of the circular body of the lower support and wherein the legs connect the upper support to the lower support, the legs extend outward at an angle from the top of the stand to a bottom of the stand and the bottom of the stand is wider than the top of the stand;
        wherein, the lower end of each leg is attached to a rubber suction cup at the bottom of the stand, the suction cup is secured to the surface and the suction cup prevents movement of the legs when the stand is placed on the surface,
        wherein, the lower support is secured to the legs below the upper support and closer to the suction cups, the lower support securing the legs near the bottom of the stand and keeping the legs from siding apart, a removable lower drip plate resting on a top of the outer surface of the circular body of the lower support;

four alligator clips securing the piping bag inside the stand while holding the bag open to be filled with food, the clips having long, serrated jaws and a spring-loaded hold, each of the four clips located on and secured to a respective one of each of the four legs along the length of the legs near the upper end of each leg, the clips located near the top of the stand directly under the upper support, the jaws of the clips extending upward toward the upper support and engaging an edge of the piping bag;

wherein the stand is constructed from dishwasher safe stainless steel;

wherein, the piping bag is removable and constructed of washable nylon or heavy clear plastic, wherein a top of the bag is secured to and extends over the body of the upper support, each of the jaws of the clips engaging an edge of the piping bag; a body of the bag extending down through an interior of the circular body of the upper support and an interior of the circular body of the lower support, the bag resting on the removable plate and thereby secured inside the stand, wherein the removable lower plate catches any dripping of food.

\* \* \* \* \*